(12) United States Patent
Tanaka et al.

(10) Patent No.: US 7,207,708 B2
(45) Date of Patent: Apr. 24, 2007

(54) LIGHT GUIDE PLATE, LIGHTING APPARATUS AND LIQUID CRYSTAL DISPLAY PROVIDED WITH THE SAME, AND LIGHT GUIDE PLATE MOLDING DIE

(75) Inventors: Shinya Tanaka, Matsusaka (JP); Masaaki Kobayashi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 254 days.

(21) Appl. No.: 10/992,928

(22) Filed: Nov. 18, 2004

(65) Prior Publication Data
US 2005/0111209 A1    May 26, 2005

(30) Foreign Application Priority Data
Nov. 25, 2003    (JP) .............................. 2003-394193
Oct. 7, 2004    (JP) .............................. 2004-295122

(51) Int. Cl.
*F21V 8/00*    (2006.01)

(52) U.S. Cl. ...................................... 362/619

(58) Field of Classification Search .................. 362/31, 362/619
See application file for complete search history.

(56) References Cited

U.S. PATENT DOCUMENTS

| | | | | |
|---|---|---|---|---|
| 5,178,447 A | * | 1/1993 | Murase et al. | 362/621 |
| 5,550,676 A | * | 8/1996 | Ohe et al. | 359/599 |
| 5,921,651 A | * | 7/1999 | Ishikawa | 362/624 |
| 6,024,463 A | * | 2/2000 | Ishikawa et al. | 362/621 |
| 6,280,043 B1 | * | 8/2001 | Ohkawa | 362/626 |

FOREIGN PATENT DOCUMENTS

| | | |
|---|---|---|
| JP | 10-188642 A | 7/1998 |
| JP | 2002-169033 A | 6/2002 |
| JP | 2003-39487 A | 2/2003 |

* cited by examiner

*Primary Examiner*—Laura K. Tso
(74) *Attorney, Agent, or Firm*—Keating & Bennett, LLP

(57) ABSTRACT

A light guide plate includes at least one surface including a first region having relatively small surface roughness and a second region having relatively great surface roughness, which are adjacently formed. A boundary-blurring pattern composed of a plurality of surface roughness aspects is formed in a boundary part between the first region and the second region.

9 Claims, 6 Drawing Sheets

LIGHT GUIDE PLATE, LIGHTING APPARATUS AND LIQUID CRYSTAL DISPLAY PROVIDED WITH THE SAME, AND LIGHT GUIDE PLATE MOLDING DIE

CROSS REFERENCE TO RELATED APPLICATION

This Nonprovisional application claims priority under 35 U.S.C. §119 (a) to Patent Application No. 2003-394193, filed in Japan on Nov. 25, 2003, and to Patent Application No. 2004-295122, filed in Japan on Oct. 7, 2004, the entire contents of which are hereby incorporated by reference.

BACKGROUND OF THE INVENTION

1. Field of the Invention

The present invention relates to a light guide plate used in a lighting apparatus such as a backlight of a liquid crystal display, a lighting apparatus and a liquid crystal display provided with the light guide plate, and a light guide plate molding die.

2. Description of the Prior Art

According to a known backlight of a liquid crystal display, a reflection sheet is provided on a reflection side of a light guide plate, and a prism sheet and a diffusion sheet or a polarized light reflection sheet are laminated on a light emission side of the light guide plate. Light input from a side of the light guide plate is uniformly emitted from light emission surface of the light guide plate to uniformly irradiate a liquid crystal display panel provided in front of the diffusion sheet or the polarized light reflection sheet. According to this light guide plate, protrusions are formed on the reflection surface (on the side of the reflection sheet) and the light emission surface with predetermined surface roughness to adjust direction and spread, or luminance and uniformity, of the light emitted from the light emission surface of the light guide plate.

Japanese Unexamined Patent Publication No. 10-188642 discloses a light guide plate, for use in a lighting apparatus for performing surface illumination such as a backlight, having a reflection pattern which reflects light diffusely, in which a first reflection pattern is provided on one surface of the light guide plate and a second reflection pattern is provided so as not to overlap with the first reflection pattern on the other surface of the light guide plate. Japanese Unexamined Patent Publication No. 10-188642 further discloses that, because the reflection patterns are provided so as not to overlap with each other, light diffused and reflected by each reflection pattern is emitted from slits in the reflection pattern on the opposite side surface, so that illumination can be performed from both sides of the one light guide plate.

Japanese Unexamined Patent Publication No. 2002-169033 discloses a directional light guide plate in which light from an end face is emitted from each of the front and the back surfaces of the light guide plate, in which many fine spherical protrusions are provided on a side of a light emission surface, in which a prism is continuously provided on the opposed surface in the direction perpendicular to the light emission surface, and in which a diffusion protrusion pattern having small angular protrusions are superimposed in a region having relatively low luminance on the light emission surface. Japanese Unexamined Patent Publication No. 2002-169033 discloses that with this directional light guide plate, a uniform and high-luminance surface light source for a large screen is achieved.

The known light guide plate is molded by injection molding, and the protrusions are formed by transferring recesses formed on a molding surface of an insert die provided in the die. The recesses of the insert die are formed by a sand blasting method or other suitable method. More specifically, first, the entire surface of the insert die is lightly sandblasted to adjust the luminance and the uniformity characteristics of the light guide plate to be molded, and then, the portion of the insert die in which surface roughness is needed to be rougher is sandblasted again.

The recesses are formed in portions of the insert die in which the surface roughness of the insert die corresponds to the surface roughness of the light guide plate, which is a molded product. However, in the case where the recesses are formed by the method described above, when light is emitted from the molded light guide plate, luminance non-uniformity is created at a boundary portion in which the surface roughness changes, which appears on a display screen of the liquid crystal display.

Japanese Unexamined Patent Publication No. 2003-39487 discloses a method for forming a gradation pattern of protrusions on a molding surface of an insert die of a light guide plate molding die by projecting a shot blasting material into strips on the surface of the insert die of the light guide plate molding die at a controlled pressure in parallel. The difference in protrusion forming pressure variation is not to be more than 0.02 MPa in the portion between adjacent blast bands having protrusions with different diameters and depths. Japanese Unexamined Patent Publication No. 2003-39487 discloses that non-uniformity is not created at a boundary portion between the blast bands because of the gradation pattern by the protrusions.

SUMMARY OF THE INVENTION

To overcome the problems described above, preferred embodiments of the present invention provide a light guide plate in which luminance non-uniformity is not created at a boundary portion in which surface roughness changes, a lighting apparatus and a liquid crystal display provided with the light guide plate, and a light guide plate molding die.

A light guide plate according to the preferred embodiments of the present invention includes at least one surface including a first region having relatively small surface roughness and a second region having relatively great surface roughness, which are adjacently formed.

A boundary-blurring pattern formed of a plurality of surface roughness aspects is located in a boundary portion between the first region and the second region.

The surface roughness can be the arithmetic average roughness (Ra), the average height (Ry), or the ten-point average roughness (Rz).

The surface roughness aspect is a surface aspect that corresponds to the surface roughness of the first region or the second region in the light guide plate. For example, when the surface roughness is small, the surface roughness aspect is a surface that is close to a mirror surface, and when the surface roughness is great, the surface roughness aspect is a course surface.

The boundary-blurring pattern can be a checkered pattern, a mosaic pattern, or a concavo-convex mesh pattern along the boundary portion between the first region and the second region.

The light guide plate of the preferred embodiments of the present invention can be used in a backlight provided on the back of a liquid crystal display panel as a light valve in a lighting apparatus or a liquid crystal display that is a surface light source.

The light guide plate of the preferred embodiments the present invention can be manufactured by injection molding. A light guide plate molding die used in the injection molding is subjected to a surface treatment on its molding surface corresponding to the surface having the first and second regions of the light guide plate in such a manner that a boundary-blurring pattern formed of a plurality of surface roughness aspects is located in the boundary portion between the first region and the second region of the light guide plate.

As the surface treatment, a sand blasting method can be used.

These objects and other objects, features and advantages of the present invention will become more apparent from the following detailed description of the present invention when taken in conjunction with the accompanying drawings.

DETAILED DESCRIPTION OF THE PREFERRED EMBODIMENTS

Figure 1:
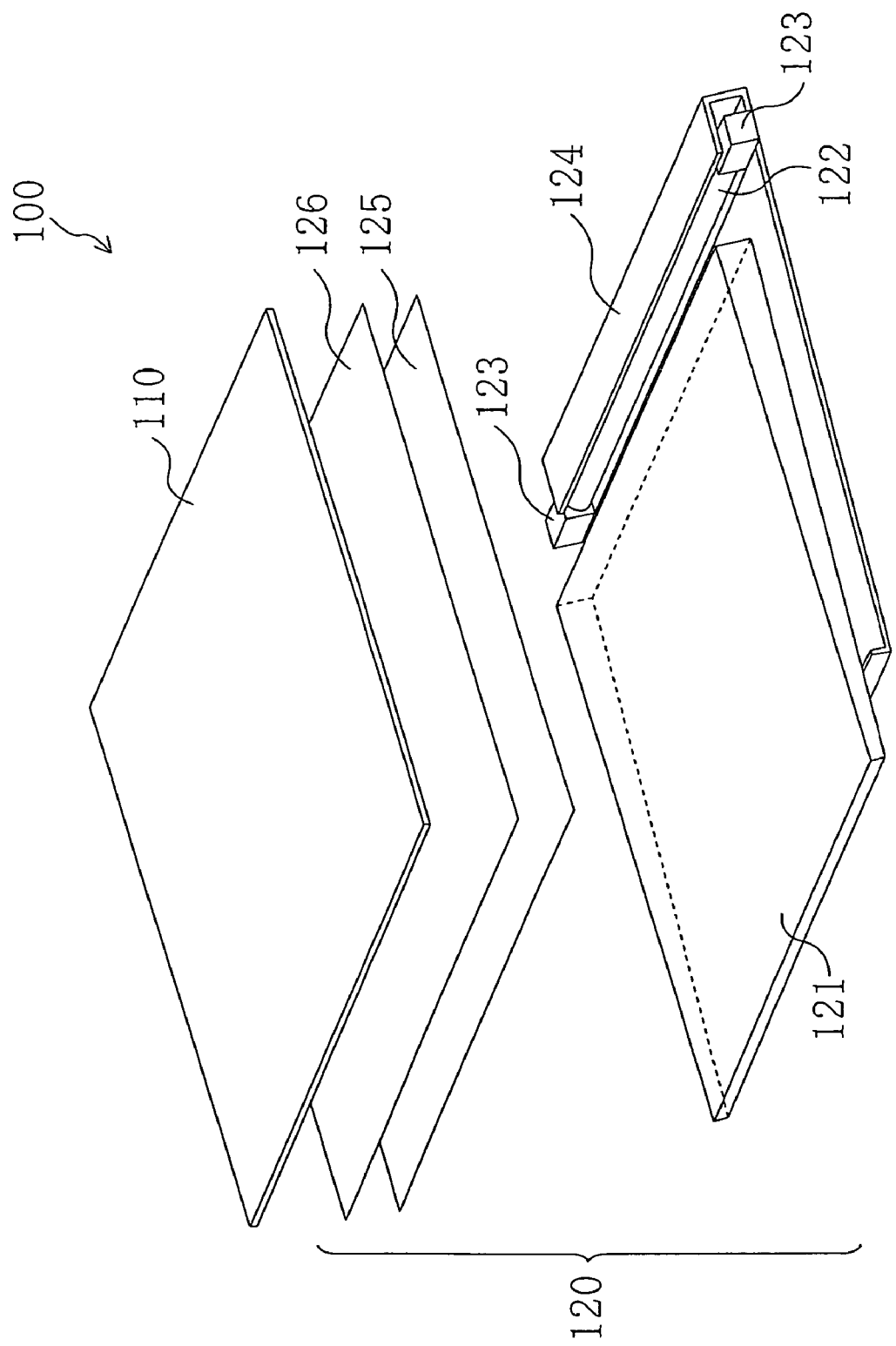
FIG. 1 is a perspective view showing a liquid crystal display according to a first preferred embodiment of the present invention.

A light guide plate according to a preferred embodiment of the present invention includes at least one surface including a first region having relatively small surface roughness and a second region having relatively great surface roughness, which are adjacently formed. A boundary-blurring pattern formed of a plurality of surface roughness aspects is located in the boundary portion between the first region and the second region.

Because the boundary-blurring pattern is formed in the boundary portion between the first region and the second region, the surface roughness is not largely or suddenly changed in the boundary portion between the first region and the second region, so that the change in surface roughness can be moderate in the boundary portion between the first region and the second region by the boundary-blurring pattern. Therefore, when the light from the light source is emitted from the light guide plate, luminance non-uniformity can be prevented from being created in the boundary portion in which the surface roughness changes.

The surface roughness can be the arithmetic average roughness (Ra), the average height (Ry), or the ten-point average roughness (Rz).

The surface roughness aspect is a surface aspect that corresponds to the surface roughness of the first region or the second region in the light guide plate. For example, when the surface roughness is small, the surface roughness aspect is a mirror surface, and when the surface roughness is great, the surface roughness aspect is a course surface.

The boundary-blurring pattern can include a checkered pattern, a mosaic pattern, or a concavo-convex mesh pattern along the boundary portion between the first region and the second region.

When the boundary-blurring pattern is the checkered pattern, the checkered pattern is preferably formed by the surface roughness aspect of the first region and the surface roughness aspect of the second region.

The light guide plate is generally manufactured by injection molding, and in order to form the surface roughness of the first and second regions and the boundary portion thereof, it is necessary to perform a surface treatment on the corresponding molding surface of a molding die by sand blasting or other suitable method. In the case of the checkered pattern as described above, because the surface treatment at the portion corresponding to the boundary portion can be performed only by performing a surface treatment for forming the first region and a surface treatment for forming the second region, the surface treatment of the light guide plate molding die can be simplified.

When the boundary-blurring pattern is the mosaic pattern, the mosaic pattern is preferably formed of a plurality of surface roughness aspects between the surface roughness aspect of the first region and the surface roughness aspect of the second region.

In the case of the mosaic pattern as described above, when the surface treatment of the light guide plate molding die is performed by sand blasting, it suffices to perform the surface treatment for forming the first region and the surface treatment for forming the second region step by step. When the boundary-blurring pattern is the concavo-convex mesh pattern, the concavo-convex mesh pattern is preferably formed of the surface roughness aspect of the first region and the surface roughness aspect of the second region.

In the case of the concavo-convex mesh pattern as described above, because the surface treatment at the portion corresponding to the boundary portion can be performed only by performing a surface treatment for forming the first region and a surface treatment for forming the second region, the surface treatment of the light guide plate molding die can be simplified.

The light guide plate can be used in a backlight provided on the back of a liquid crystal display panel as a light valve in a lighting apparatus or a liquid crystal display that is a surface light source.

The light guide plate can be manufactured by injection molding. A light guide plate molding die used in the injection molding is subjected to a surface treatment on its molding surface corresponding to the surface having the first and second regions of the light guide plate in such a manner that the boundary-blurring pattern formed of a plurality of surface roughness aspects is located in the boundary portion between the first region and the second region of the light guide plate.

Hereinafter, preferred embodiments of the present invention will be described with reference to the accompanying drawings.

First Preferred Embodiment

FIG. 1 is a view showing a liquid crystal display 100 according to the first preferred embodiment of the present invention.

The liquid crystal display 100 includes a liquid crystal display panel 110 and a backlight (lighting apparatus) 120 provided on the back liquid crystal display panel 110.

The liquid crystal display panel 110, which includes a liquid crystal layer sandwiched by a pair of substrates, functions as a light valve.

The backlight 120 has a cuneiform light guide plate 121 made of a transparent acrylic resin (PMMA), for example, and a cold cathode fluorescent lamp 122 is provided at a thicker side of the light guide plate 121. The cold cathode fluorescent lamp 122 is held by a rubber holder 123 for a light source, and a reflection sheet 124 is provided to surround the cold cathode fluorescent lamp 122 and covers a back surface of the light guide plate 121, that is, a non-emission surface of the light guide plate 121. A prism sheet 125 and a diffusion sheet 126 are provided to be laminated on a front surface of the light guide plate 121, that is, an emission surface of the light guide plate 121. The backlight 120 functions as a surface light source that emits uniform light from the emission surface of the light guide plate 121 to the liquid crystal display panel 110.

Figure 2:
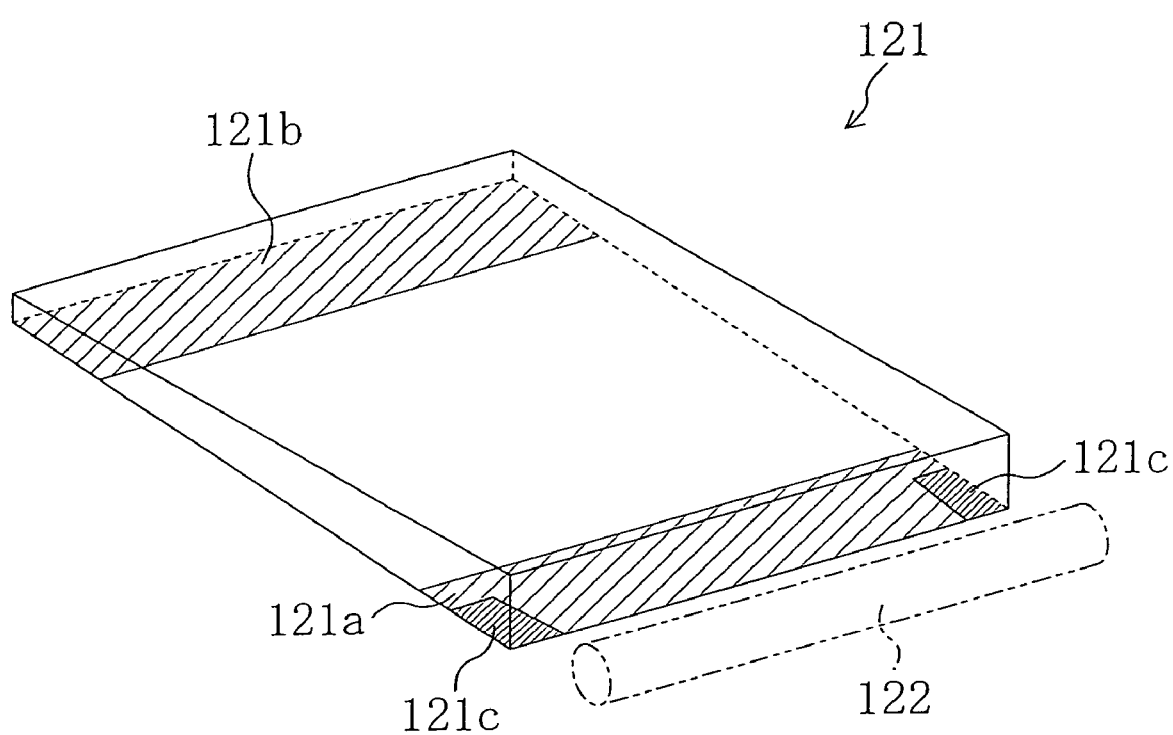
FIG. 2 is a perspective view showing a light guide plate according to the first preferred embodiment of the present invention.

FIG. 2 is a view showing the light guide plate 121.

The light guide plate 121 has a predetermined surface roughness on a front surface, which is the emission surface, and/or a back surface, which is the non-emission surface. More specifically, a first region 10 is formed on an almost the entire surface of the light guide plate 121 in which regular sized protrusions are provided at a predetermined density to have a relatively small surface roughness, and a second region 20 is formed in a portion of the light guide plate 121 having a small amount of light guided from the cold cathode fluorescent lamp 122 to have a relatively great surface roughness to increase reflection and diffusion of the light. The second region 20 at least includes a portion 121a in the vicinity of the thick end face of the light guide plate 121 in which reflection and diffusion of light is insufficient, a portion 121b in the vicinity of a thin end face of the light guide plate 121 in which an absolute amount of the light is insufficient, and a portion 121c at both corners on the thick side of the light guide plate 121 in which a light guided amount is insufficient in the presence of the light source rubber holder 123. The surface roughness can mean the arithmetic average roughness (Ra), the average height (Ry) or the ten-point average roughness (Rz).

Figure 3:
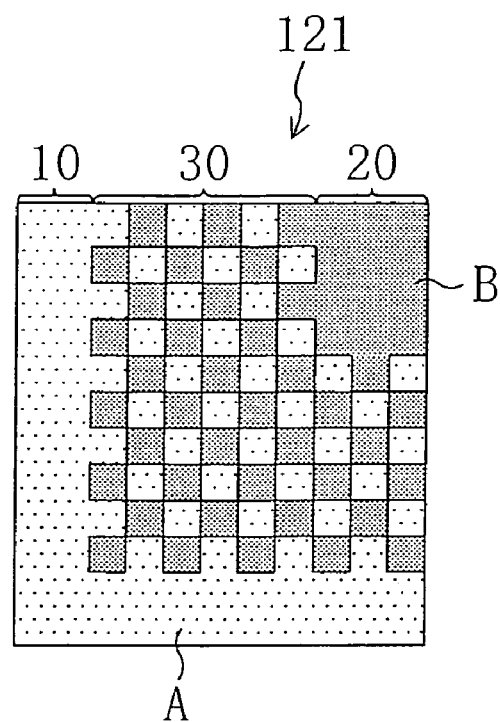
FIG. 3 is a plan view showing the boundary portion between the first region and the second region of a surface of the light guide plate according to the first preferred embodiment of the present invention.

FIG. 3 is a view showing a surface of the light guide plate 121.

A boundary-blurring pattern formed by arrangement of a plurality of surface roughness aspects, that is, surface aspects that correspond to the surface roughness, is formed in a boundary portion 30 between the first region 10 and the second region 20. More specifically, the boundary-blurring pattern is a checkered pattern of surface roughness aspect A of the first region 10 and of surface roughness aspect B of the second region 20, in which each element is of about 2 mm to about 3 mm square, as shown in FIG. 3.

Figure 4:
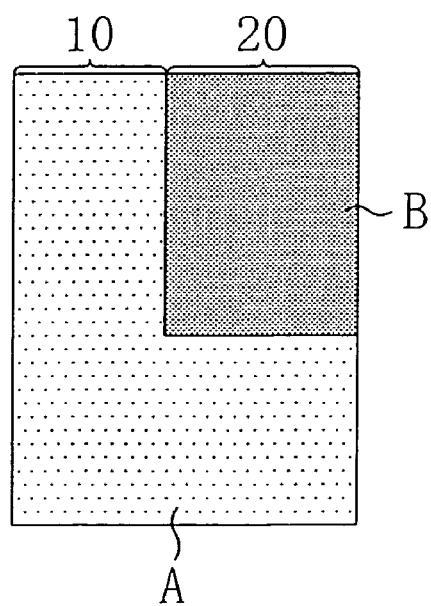
FIG. 4 is a plan view showing the boundary portion of the first region and the second region of a surface of a light guide plate in which a boundary-blurring pattern is not provided.

Because the checkered boundary-blurring pattern is formed in the boundary portion 30 between the first region 10 and the second region 20, the surface roughness is not largely or suddenly changed at the boundary portion 30 between the first region 10 and the second region 20 as shown in FIG. 4, so that the change in surface roughness can be moderate at the boundary portion 30 between the first region 10 and the second region 20 by the boundary-blurring pattern. Therefore, even when the light from the light source is emitted from the light guide plate 121, luminance non-uniformity can be prevented from being created at the boundary portion 30 in which the surface roughness changes.

This light guide plate 121 can be manufactured by injection molding.

Figure 5:
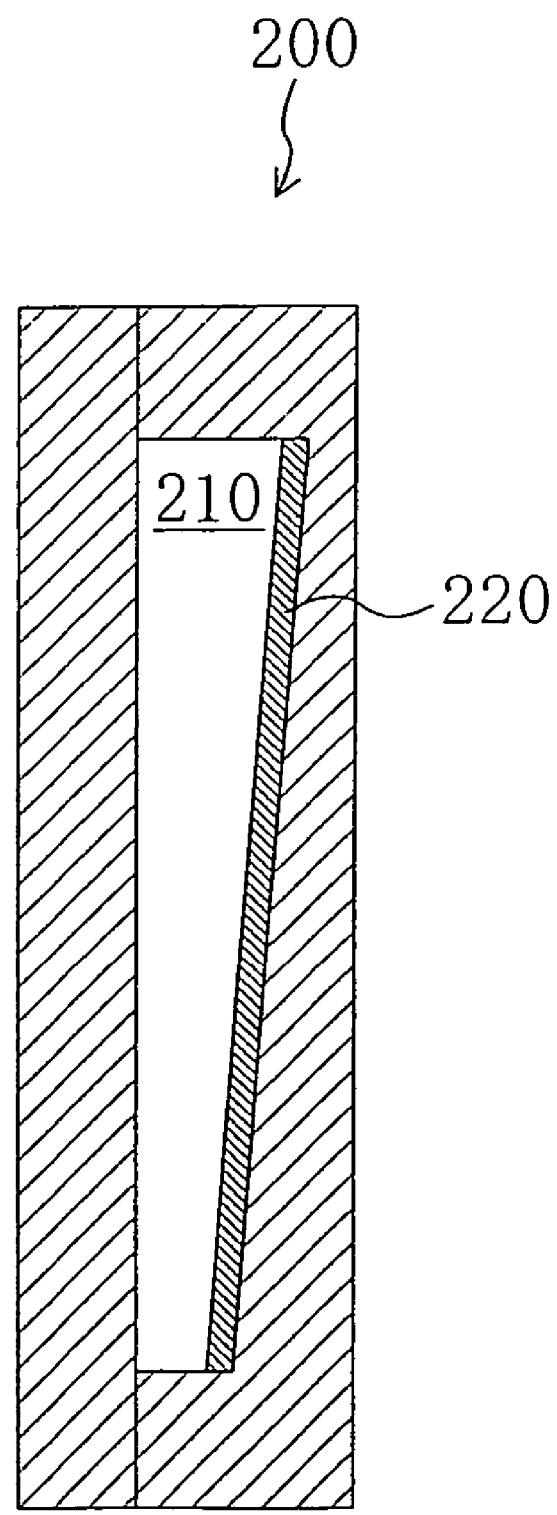
FIG. 5 is a sectional view showing a light guide plate molding die according to the first preferred embodiment of the present invention.

FIG. 5 is a view showing a light guide plate molding die 200 for molding the light guide plate 121.

The light guide plate molding die 200 includes a cavity 210 corresponding to an outline of the cuneiform light guide plate 121, and an inner die 220 is provided to correspond to the front surface and/or back surface of the light guide plate 121 (only the inner die 220 for molding one surface of the light guide plate 121 is shown in FIG. 5). On the molding surface of the inner die 220, a surface treatment to form many recesses has been performed so that the protrusions on the surface of the light guide plate 121 can be molded. More specifically, first, the entire molding surface is sandblasted so that the surface roughness can become about No. 400 or less. Then, the portion corresponding to the first region 10 and the portion corresponding to the surface roughness aspect A of the first region 10 in the boundary portion 30 are masked, and an exposed portion, the portion corresponding to the second region 20, and the portion corresponding to the surface roughness aspect B of the second region 20 in the boundary portion 30 are sandblasted again such that the surface roughness can become about No. 20 or more. Because the boundary portion 30 is formed by the checkered pattern that includes the surface roughness aspect A of the first region 10 and the surface roughness aspect B of the second region 20, in the above light guide plate 121, the surface treatment at the boundary portion can be performed only by performing the surface treatment for forming the first region 10 and the surface treatment for forming the second region 20.

The above light guide plate molding die 200 is mounted on an end of a nozzle of an injection molding machine, and a molten resin from the injection molding machine is filled in the cavity 210 and cooled down, whereby the light guide plate 121 having the above structure on which the molding face of the inner die 220 is transferred is provided.

Second Preferred Embodiment

A liquid crystal display according to the second preferred embodiment of the present invention is similar as the first preferred embodiment, except for the structure of the light guide plate 121. The same reference numerals denote the same components as in the first preferred embodiment.

Figure 6:
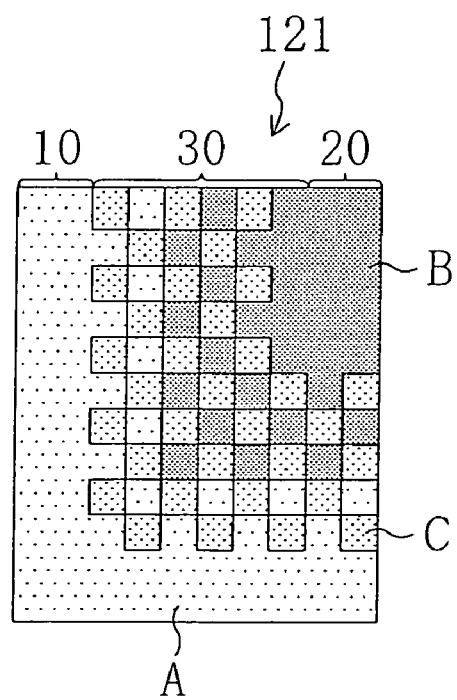
FIG. 6 is a plan view showing the boundary portion between the first region and the second region of a surface of a light guide plate according to a second preferred embodiment of the present invention.

FIG. 6 is a view showing a surface of the light guide plate 121.

Figure 7:
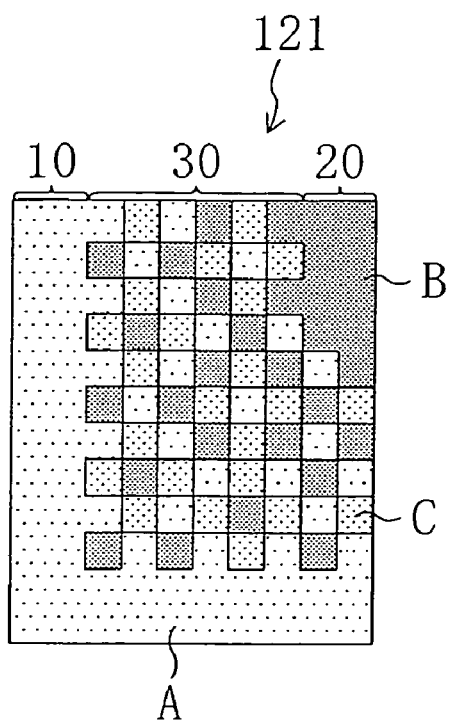
FIG. 7 is a plan view showing the boundary portion between the first region and the second region of a surface of a light guide plate according to a variation of the second preferred embodiment of the present invention.

A boundary-blurring pattern formed by arrangement of a plurality of surface roughness aspects, that is, surface aspects that correspond to the surface roughness formed in a boundary portion 30 between the first region 10 and the second region 20. More specifically, the boundary-blurring pattern is a mosaic pattern of surface roughness aspect A of the first region 10, surface roughness aspect B of the second region 20, and surface roughness aspect C in the middle thereof, in which each element is of about 2 mm to about 3 mm square. Other arrangements and working effects are the same as in the light guide plate 121 in the first preferred embodiment. In addition, the mosaic pattern is not limited to the one shown in FIG. 6 and can be the pattern shown in FIG. 7.

On a molding surface of the insert die 220 of a light guide plate molding die for molding the above light guide plate 121, a surface treatment for forming many recesses is performed to correspond to the protrusions on the surface of the light guide plate 121 to be molded. More specifically, first, the entire molding surface is sandblasted to have a low level of roughness. Then, the portion corresponding to the first region 10 and the portion corresponding to the surface roughness aspect A of the first region 10 in the boundary portion 30 are masked, and an exposed portion is sandblasted again have a middle level of roughness. Then, the portion corresponding to the middle surface roughness aspect C is masked, and the exposed portion, including the portion corresponding to the second region 20 and the portion corresponding to the surface roughness aspect B of the second region 20 in the boundary portion 30, is sandblasted to have a high level of roughness. According to this light guide plate 121, because the boundary portion 30 is formed by the mosaic pattern, which includes the surface roughness aspect A of the first region 10, the surface roughness aspect B of the second region 20, and the surface roughness aspect C in the middle thereof, the surface treatment for forming the first region 10 and the surface treatment for forming the second region 20 only have to be performed step by step. The other arrangements and a molding method of the light guide plate 121 are the same as in the first preferred embodiment.

Third Preferred Embodiment

A liquid crystal display according to third preferred embodiment of the present invention is the same as the first preferred embodiment, except for the structure of the light guide plate 121. The same reference numerals denote the same components as in the first preferred embodiment.

Figure 8:
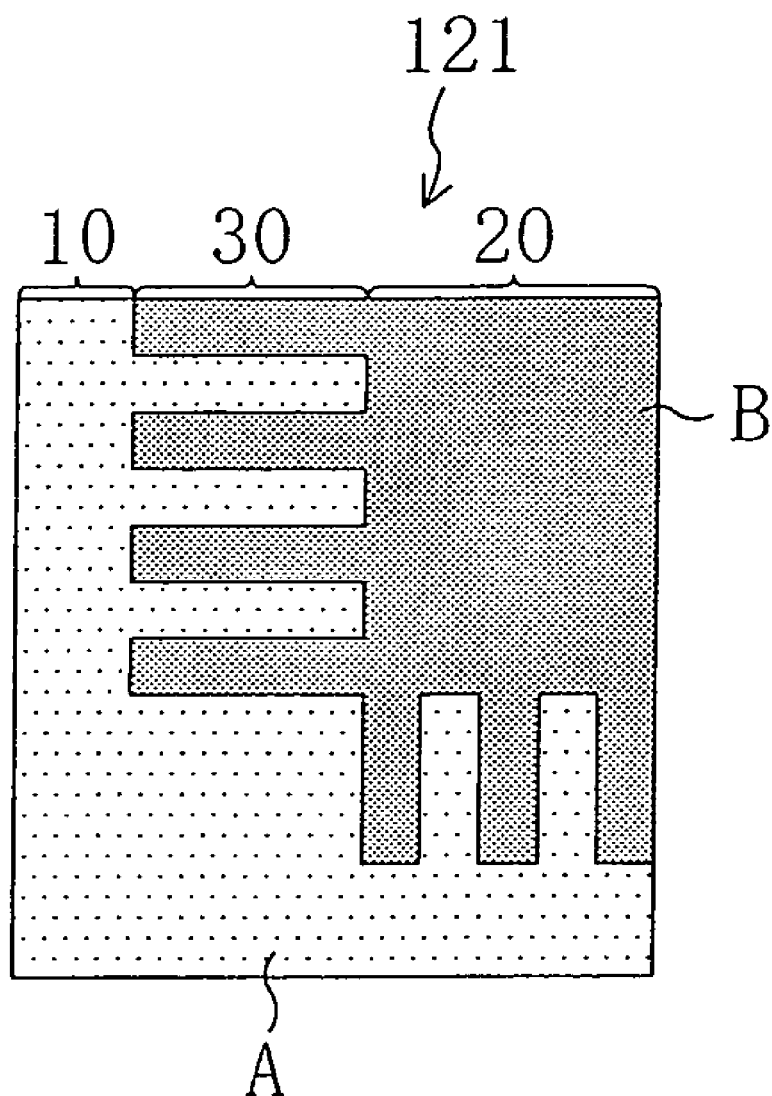
FIG. 8 is a plan view showing the boundary portion between the first region and the second region of a surface of a light guide plate according to an third preferred embodiment of the present invention.

FIG. 8 is a view showing a surface of the light guide plate 121.

A boundary-blurring pattern formed of a plurality of surface roughness aspects, that is, surface aspects that correspond to the surface roughness, is located in a boundary portion 30 between a first region 10 and a second region 20. More specifically, the boundary-blurring pattern is a concavo-convex mesh pattern along the boundary portion 30 between the first region 10 and the second region 20. With the concavo-convex mesh pattern, the boundary portion 30 between the first region 10 of a surface roughness aspect A and the second region 20 of a surface roughness aspect B is formed in the shape of rectangle where tine-shaped concavities and convexities of an edge of the first region 10 mesh with tine-shaped concavities and convexities of an edge of the second region 20. Each of these tine-shaped concavities and convexities has a width of about 1 mm or less, about 2 mm to about 3 mm, or about 3 mm or more and has a length of about 2 mm to about 20 mm. The other arrangements and a working effect are the same as in the light guide plate 121 of the first preferred embodiment.

On a molding surface of an insert die of a light guide plate molding die for molding the light guide plate 121, a surface treatment for forming many recesses is performed corresponding to the protrusions on the surface of the light guide plate 121 to be molded. More specifically, first, the entire molding surface is sandblasted so that the surface roughness can become about No. 400 or less. Then, the portion corresponding to the first region 10 is masked, and the exposed portion, including the portion corresponding to the second region 20, is sandblasted again to the degree of surface roughness of about No. 20 or more. According to this light guide plate 121, because the boundary portion 30 is formed by the concavo-convex mesh pattern, including the surface roughness aspect A of the first region 10 and the surface roughness aspect B of the second region 20, the surface treatment for the boundary portion 30 can be performed only by performing the surface treatment for forming the first region 10 and the surface treatment for forming the second region 20. The other arrangements and a molding method of the light guide plate 121 are the same as in the first preferred embodiment.

Other Preferred Embodiments

Although the light guide plate 121 is the cuneiform in the above first, second, and third preferred embodiments, the present invention is not limited to this and can be in the shape of flat plate.

In addition, although the prism sheet 125 and the diffusion sheet 126 are used in the above first, second, and third preferred embodiments, a combination of the diffusion sheet, the prism sheet, and a polarized light reflection sheet can be used.

Furthermore, although the cold cathode fluorescent lamp 122 is used in the above first, second, and third preferred embodiments, the present invention is not limited to this and can include an LED or suitable light source.

Still furthermore, although each element of the boundary-blurring pattern is in the shape of a square in the above first and second preferred embodiments, the present invention is not limited to this and it can be in the shape of a rectangle.

In addition, although the boundary line between the first region 10 and the second region 20 is concavo-convex mesh pattern formed in the shape of rectangles in the third preferred embodiment, the present invention is not limited to this and it can be a concavo-convex mesh pattern formed in the shape of sinusoidal waveform or any other suitable waveform.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light guide plate comprising at least one surface including a first region having relatively small surface roughness and a second region having relatively great surface roughness, which are adjacent to each other; wherein
    a boundary-blurring pattern including a plurality of surface roughness aspects is provided in a boundary part between the first region and the second region; and
    the boundary-blurring pattern is a checkered pattern.

2. The light guide plate of claim 1, wherein
    the checkered pattern of the boundary-blurring pattern is composed of a surface roughness aspect of the first region and a surface roughness aspect of the second region.

3. A light guide plate comprising at least one surface including a first region having relatively small surface roughness and a second region having relatively great surface roughness, which are adjacent to each other; wherein
a boundary-blurring pattern including a plurality of surface roughness aspects is provided in a boundary part between the first region and the second region; and
the boundary-blurring pattern is a mosaic pattern.

4. The light guide plate of claim 3, wherein
the mosaic pattern of the boundary-blurring pattern is composed of a plurality of surface roughness aspects between a surface roughness aspect of the first region and a surface roughness aspect of the second region.

5. A light guide plate comprising at least one surface including a first region having relatively small surface roughness and a second region having relatively great surface roughness, which are adjacent to each other; wherein
a boundary-blurring pattern including a plurality of surface roughness aspects is provided in a boundary part between the first region and the second region, and
the boundary-blurring pattern is a concavo-convex mesh pattern along a boundary part between the first region and the second region.

6. The light guide plate of claim 5, wherein
the concavo-convex mesh pattern of the boundary-blurring pattern is composed of a surface roughness aspect of the first region and a surface roughness aspect of the second region.

7. A lighting apparatus provided with a light guide plate, wherein
the light guide plate comprises at least one surface including a first region having relatively small surface roughness and a second region having relatively great surface roughness, which are adjacently formed, and a boundary-blurring pattern composed of a plurality of surface roughness aspects is formed in a boundary part between the first region and the second region, and
the boundary-blurring pattern is a checkered pattern.

8. A liquid crystal display comprising:
a liquid crystal display panel as a light valve; and
a backlight provided on a back side of the liquid crystal display panel and having
a light guide plate, wherein
the light guide plate of the backlight comprises at least one surface including a first region having relatively small surface roughness and a second region having relatively great surface roughness, which are adjacently formed, and a boundary-blurring pattern composed of a plurality of surface roughness aspects is formed in a boundary part between the first region and the second region, and
the boundary-blurring pattern is a mosaic pattern.

9. A light guide plate molding die for molding a light guide plate comprising at least one surface including a first region having relatively small surface roughness and a second region having relatively great surface roughness, which are adjacently formed, wherein
a surface treatment is performed on a molding surface corresponding to the surface having the first and second regions of the light guide plate so as to form a boundary-blurring pattern composed of a plurality of surface roughness aspects in a boundary part between the first and second regions of the light guide plate, and
the boundary-blurring pattern a concavo-convex mesh pattern along a boundary part between the first region and the second region.

* * * * *